United States Patent
Tsuchida (10) Patent No.: US 8,862,383 B2
(45) Date of Patent: Oct. 14, 2014

(54) APPARATUS FOR JUDGING PROBABILITY OF COLLISION BETWEEN VEHICLE AND OBJECT SURROUNDING THE VEHICLE

(71) Applicant: Denso Corporation, Kariya (JP)

(72) Inventor: Norio Tsuchida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/098,841

(22) Filed: Dec. 6, 2013

(65) Prior Publication Data

US 2014/0163859 A1     Jun. 12, 2014

(30) Foreign Application Priority Data

Dec. 11, 2012   (JP) .................................. 2012-270469

(51) Int. Cl.
G06F 17/10        (2006.01)
G01S 13/93        (2006.01)
G01G 1/16         (2006.01)

(52) U.S. Cl.
CPC .............. G01S 13/931 (2013.01); *G01G 1/16* (2013.01); *G01S 2013/9342* (2013.01); *G01S 2013/9353* (2013.01)
USPC ............ 701/301; 701/300; 340/436; 180/169

(58) Field of Classification Search
CPC . G06G 1/16; G01S 13/931; G01S 2013/9342; G01S 2013/9353; B60T 7/22
USPC ............. 701/36, 41, 45, 46, 70, 96, 300, 301; 340/435, 436, 438, 901, 903, 904; 345/419, 473, 474, 475, 619; 342/70, 342/71, 107, 109, 455; 180/169, 274, 282; 700/245, 255; 463/2, 32, 382; 307/10.1; 348/116; 382/203
See application file for complete search history.

(56) References Cited

U.S. PATENT DOCUMENTS

| | | | | |
|---|---|---|---|---|
| 4,853,700 | A * | 8/1989 | Funatsu et al. | 342/30 |
| 5,818,355 | A * | 10/1998 | Shirai et al. | 340/903 |
| 6,246,961 | B1 * | 6/2001 | Sasaki et al. | 701/301 |
| 6,317,693 | B2 * | 11/2001 | Kodaka et al. | 701/301 |
| 6,941,201 | B2 * | 9/2005 | Sudou | 701/23 |
| 7,734,416 | B2 * | 6/2010 | Yano et al. | 701/301 |
| 2001/0016798 | A1 * | 8/2001 | Kodaka et al. | 701/301 |
| 2001/0018641 | A1 * | 8/2001 | Kodaka et al. | 701/301 |
| 2004/0151345 | A1 * | 8/2004 | Morcom | 382/104 |
| 2007/0129891 | A1 * | 6/2007 | Yano et al. | 701/301 |

FOREIGN PATENT DOCUMENTS

| | | |
|---|---|---|
| JP | 2008-197720 | 8/2008 |
| JP | 2009-075650 | 4/2009 |
| JP | 2010-018162 | 1/2010 |
| JP | 2012-146146 | 8/2012 |

\* cited by examiner

*Primary Examiner* — McDieunel Marc (74) *Attorney, Agent, or Firm* — Harness, Dickey & Pierce, PLC (57) ABSTRACT

A collision judgment apparatus includes: a distance detecting unit detecting distance between a vehicle and an object; a relative speed detecting unit detecting a relative speed therebetween; a margin time calculation unit calculating a time to collision therebetween, based on the distance and the relative speed; an angle detecting unit detecting an angle of the object with respect to a running direction of the vehicle; a variation calculation unit calculating a variation of the angle over time; a setting unit setting a judgment value such that the shorter the margin time, the larger the judgment value; and a judgment unit judging that the vehicle is likely to collide with the object when the variation of the angle calculated by the variation calculation unit is lower than the judgment value set by the setting unit.

10 Claims, 6 Drawing Sheets

APPARATUS FOR JUDGING PROBABILITY OF COLLISION BETWEEN VEHICLE AND OBJECT SURROUNDING THE VEHICLE

CROSS-REFERENCE TO RELATED APPLICATION

This application is based on and claims the benefit of priority from earlier Japanese Patent Application No. 2012-270469 filed Dec. 11, 2012, the description of which is incorporated herein by reference.

BACKGROUND

1. Technical Field

The present disclosure relates to an apparatus for judging a probability of collision between a vehicle and another object.

2. Description of the Related Art

In these apparatuses, the probability of collision is judged based on a direction and a distance of the object with respect to the own vehicle. For example, Japanese Patent Application Laid-Open Publication Number 2010-18162 discloses a collision judging apparatus in which a probability of collision between the own vehicle and a moving object is determined when the horizontal-direction angle of the moving object with respect to the own vehicle has not changed for a predetermined period and the relative distance of the moving object with respect to the own vehicle becomes smaller with time.

However, the inventor has confirmed by experiments, such that a collision between the own vehicle and the moving object is likely to occur even when the horizontal-direction angle of the moving object with respect to the own vehicle changes with time. Especially, when a margin time of collision between the vehicle and the moving object, i.e., collision margin time TTC (time-to-collision) becomes shorter, location of the horizontal-direction angle with respect to the own vehicle changes easily. Therefore, according to the above-described patent document, it may be difficult to judge the probability of a collision when the collision margin time TTC is shorter.

SUMMARY

The embodiment provides an apparatus for judging collision of vehicle capable of accurately judging a probability of collision between the own vehicle and the objects surrounding the own vehicle.

As a first aspect of the disclosure, a collision judgment apparatus includes: a distance detecting unit that detects distance between a vehicle and an object surrounding the vehicle; a relative speed detecting unit that detects a relative speed between the vehicle and the object; a margin time calculation unit that calculates a margin time which is a time to collision between the vehicle and the object, based on the distance detected by the distance detecting unit and the relative speed detected by the relative speed detecting unit; an angle detecting unit that detects an angle of the object with respect to a running direction of the vehicle; a variation calculation unit that calculates a variation of the angle over time, the angle being detected by the angle detecting unit; a judgment value setting unit that sets a judgment value such that the shorter the margin time, the larger the judgment value; and a judgment unit that judges the vehicle is likely to collide with the object, when the variation of the angle calculated by the variation calculation unit is lower than the judgment value set by the judgment value setting unit.

According to the above-described configuration, the distance between the vehicle and the object and the relative speed therebetween is detected. The margin time which is a time to collision (i.e., collision margin time TTC) between the vehicle and the object is calculated based on the distance and the relative speed between the vehicle and the object. The angle of the object with respect to the running direction of the vehicle is detected and the variation of the detected angle over time is calculated.

As described above, when the collision margin time TTC becomes shorter, horizontal-direction angle of the object with respect to the vehicle changes easily. Similarly, the angle of the object with respect to the running direction of the vehicle is likely to change. In this regard, according to the above-described configuration, the judgment value used for collision is set such that the shorter the collision margin time TTC, the larger the judgment value. Moreover, it is judged that the vehicle is likely to collide with the object when the variation of the angle is smaller than the judgment value. Therefore, even when the collision margin time TIC is short, the collision judgment apparatus can accurately judge the probability of collision between the vehicle and the object.

DETAILED DESCRIPTION OF THE PREFERRED EMBODIMENTS (Embodiment)

Figure 1:
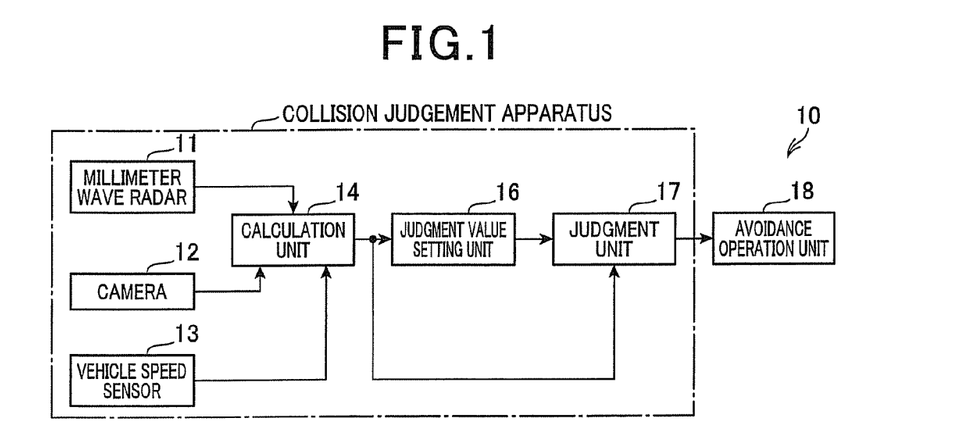
FIG. 1 is a block diagram showing an overall configuration of the collision avoidance apparatus according to the embodiment of the present disclosure.

With reference to the drawings, hereinafter is described an embodiment of the present disclosure. According to the embodiment, a collision avoidance apparatus is mounted on a vehicle (own vehicle) and configured to avoid a collision between the own vehicle and the object surrounding the own vehicle. As shown in FIG. 1, the collision avoidance apparatus 10 includes a millimeter-wave radar 11, a camera 12, a vehicle speed sensor 13, a calculation unit 14, a judgment value setting unit 16, a judgment unit 17 and an avoidance operation unit 18. It is noted that the millimeter-wave radar 11, the camera 12, the vehicle speed sensor 13, the calculation unit 14, the judgment value setting unit 16 and the judgment unit 17 constitute the collision judgment apparatus.

The millimeter wave radar 11 is disposed in the front side of the vehicle and detects an object that exists within a predetermined area in front of the own vehicle (i.e., surrounding object). Specifically, the millimeter wave radar 11 (distance detecting unit and relative speed detecting unit) detects the distance between the own vehicle and the object and the relative speed between the own vehicle and the object. The camera 12 is configured as a stereo camera or single lens camera and acquires an image surrounding the own vehicle. The vehicle speed sensor 13 (vehicle speed detecting unit) detects the running speed of the own vehicle.

The calculation unit 14, the judgment value setting unit 16 and the judgment unit 17 are constituted by ECU (Electronic Control Unit). The ECU is a known microcomputer provided with CPU (central processing unit), ROM (read only memory), RAM (random access memory) memory unit and I/O (input/ output) interface.

The calculation unit 14 receives signals detected by the millimeter wave radar 11 indicating the distance between the own vehicle and the object and the relative speed between the own vehicle and the object, and identifies an object of which distance from the own vehicle is shorter than a predetermined distance, to be an obstacle. The calculation unit 14 receives a signal indicating a running speed of the own vehicle detected by the vehicle speed sensor 13 and calculates a velocity of the object based on the above-described relative speed and the running speed of the own vehicle. Then, the calculation unit 14 discerns an object having the velocity faster than a predetermined velocity to be a moving object and an object having the velocity slower than a predetermined velocity to be a static object.

Moreover, the calculation unit 14 receives an image acquired by the camera 12 and compares the acquired image with the reference pattern so as to discern other vehicle existing within a predetermined range, a pedestrian, a safety rail and a roadside tree, to be obstacles. The calculation unit 14 discerns the other vehicle and the pedestrian to be moving objects and discerns the safety rail and the roadside tree to be static objects. It is noted that the pedestrian can be discerned as a static object.

Figure 2:
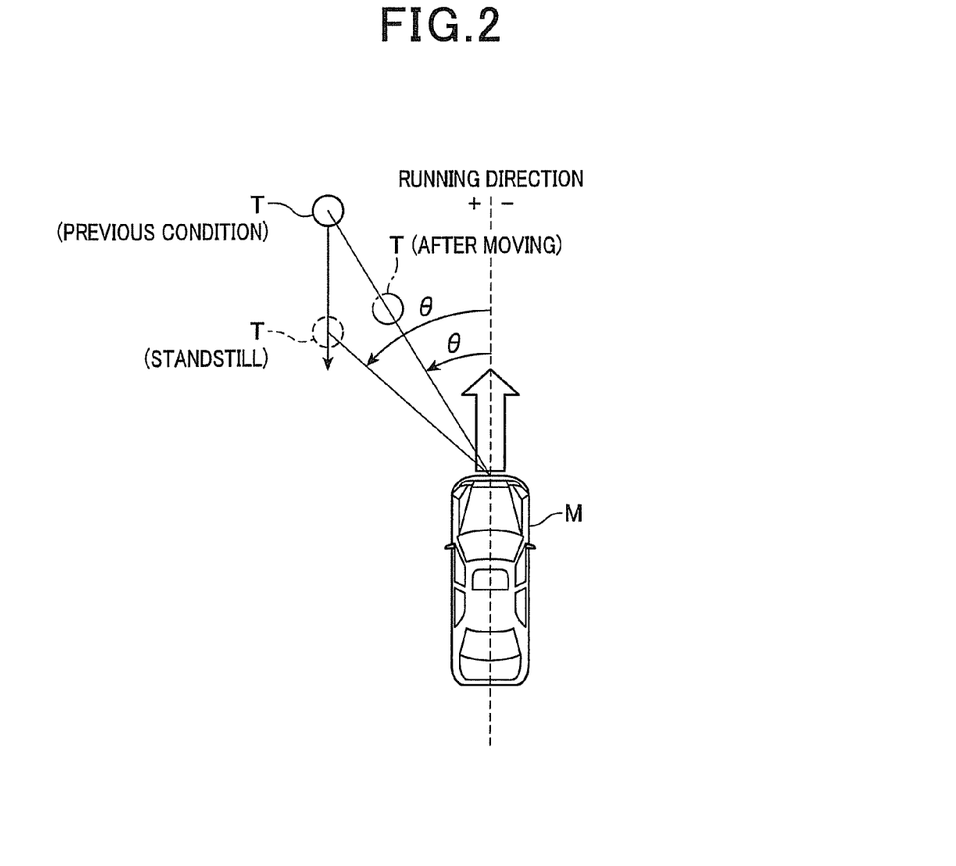
FIG. 2 is a planar view showing an angle of the object with respect to the running direction of the vehicle.

As shown FIG. 2, the calculation unit 14 calculates, based on the acquired images, the angle θ of an object T with respect to the running direction of the own vehicle. In more detail, the calculation unit 14 defines the left side with respect to the running direction of the own vehicle as a positive angle and defines the right side with respect to the running direction of the own vehicle as a negative angle, and calculates the angle θ of an object T. In this case, when the object T remains stationary, as shown in a dotted line in FIG. 2, the angle θ becomes larger when the vehicle M is running forward. Meanwhile, when the object T is moving towards a direction where the object T is likely to collide with the vehicle M (i.e., direction that crosses a direction where the vehicle M is running forward), as shown in a dashed line, the angle θ becomes substantially constant regardless the vehicle M runs forward. It is noted that the camera 12 and the calculation unit 14 constitute an angle detecting unit.

As shown in FIG. 1, the calculation unit 14 (margin time calculation unit) calculates a margin time defined as an estimated time to collision between the own vehicle and the object based on the distance between the own vehicle and the object and the relative speed therebetween which are detected by the millimeter wave radar 11. The margin time is hereinafter referred to collision margin time TTC (time-to-collision). Specifically, the distance between the own vehicle and the object is divided by the relative speed so as to calculate the collision margin time TTC. It is noted that a running speed of the own vehicle detected by the vehicle speed sensor 13 can be used as an approximate value of the relative speed used for calculating the collision margin time TTC.

The calculation unit 14 (variation calculation unit) calculates a variation Δθ of the above-described angle θ detected by the above-described angle detecting unit. The variation Δθ is defined as an amount of change of the angle θ with respect to the time (angle θ is defined as an angle with respect to the running direction of the own vehicle). Specifically, the variation Δθ is calculated such that an amount of change of the angle θ at a predetermined time unit is calculated.

The judgment value setting unit 16 sets a judgment value R used for comparing with the above-described variation Δθ during the judgment to judge a probability of collision between the own vehicle and the object. Specifically, the judgment value setting unit 16 sets the judgment value R such that the shorter the above-described collision margin time TTC calculated by the calculation unit 14, the larger the judgment value R.

The judgment unit 17 judges, based on the variation Δθ and the judgment value R, whether or not there is a probability of the own vehicle colliding with the object. In more detail, when the variation AO calculated by the calculation unit 14 is lower than the judgment value R set by the judgment value setting unit 16, the judgment unit 17 determines that the own vehicle is likely to collide with the object, and when the variation Δθ is not lower than the judgment value R, the judgment unit 17 determines that the own vehicle is likely to collide with the object.

The avoidance operation unit 18 operates an avoidance operation in order to avoid a collision between the own vehicle and the surrounding object, based on the detection result by the millimeter wave radar 11 and the camera 12. The avoidance operation unit 18 is configured by an alert unit, a brake unit of the vehicle and etc. The avoidance operation unit 18 operates at a predetermined timing when the judgment unit 17 determines that the own vehicle is likely to collide with the object. Specifically, when the collision margin time TTC becomes shorter than a predetermined operation time TE, the avoidance operation unit 18 operates. It is noted that the seat belt pretensioner that rewinds the seat belt mounted on the seat in the vehicle can be operated together with the avoidance operation operated by the avoidance operation unit 18.

Next, with reference to FIGS. 3 to 6, regarding the static object and the moving object, a change state of the angle θ of the object and the variation Δθ with respect to the running direction of the own vehicle is described. The followings are an example where an object exists in the left side of the running direction of the vehicle.

Figure 3:
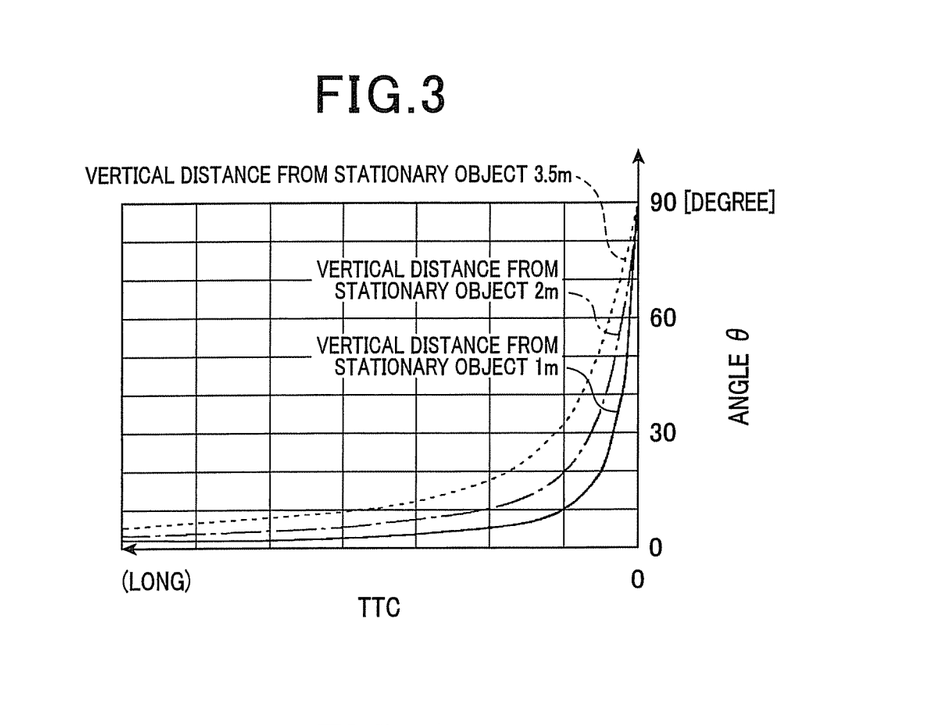
FIG. 3 is a graph showing a change state of the above-described angle at a static object.

First, with reference to FIG. 3, a change state of the angle θ of the static object with respect to the running direction of the own vehicle is described. In FIG. 3, the change state of the angle is shown when a lateral distance which is a distance between the own vehicle and the object in a direction perpendicular to the running direction of the own vehicle (a direction that crosses the running direction of the own vehicle to make substantially 90 deg angle therebetween) is defined. It is noted that FIG. 3 shows the change state of the angle θ when the lateral distances are 1 meter (solid line), 2 meters (dashed line) and 3.5 meters (dotted line).

As described above, when the object remains stationary, the angle θ becomes larger when the own vehicle is running forward. Therefore, the shorter the collision margin time TTC, the larger the angle θ in any lateral distances. When the collision margin time TTC becomes 0 (when the own vehicle reaches just besides the object) the angle θ becomes 90 degree.

Moreover, in any lateral distances, when the collision margin time TTC becomes shorter, the angle θ increases rapidly, and the longer the lateral distance, the larger the angle θ with respect to the collision margin time TTC even from early timing.

Figure 4:
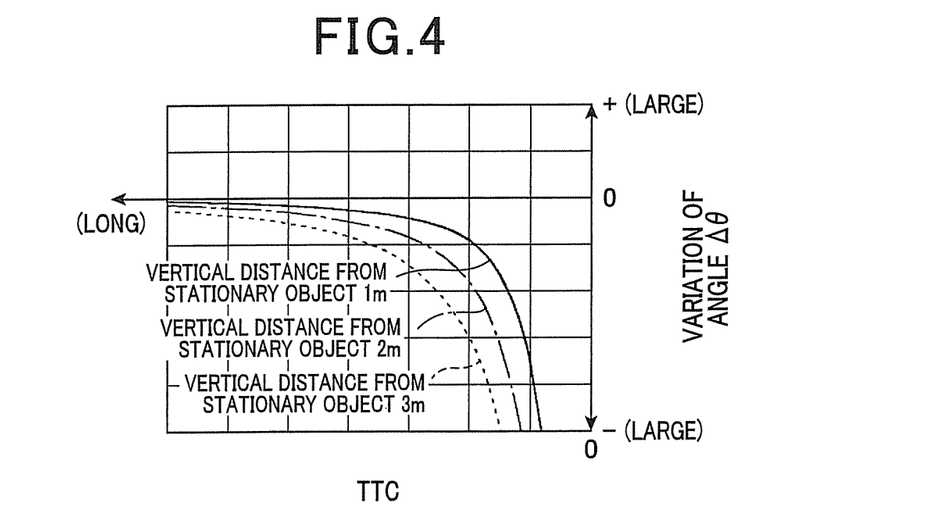
FIG. 4 is a graph showing an amount of change of the above-described angle at a static object.

FIG. 4 illustrates a change state of the variation Δθ of the angle θ when the angle θ varies as shown in FIG. 3.

In any lateral distances, the shorter the collision margin time TTC, the larger the variation Δθ (absolute value of the variation Δθ). In this respect, the variation Δθ is calculated by subtracting the current value of the angle θ from the past value of the angle θ. Hence, the variation Δθ indicates negative value, however, an amount of the variation Δθ is large. In any lateral distances, when the collision margin time TTC becomes shorter, the variation of Δθ increases rapidly, and the longer the lateral distance, the larger the variation Δθ with respect to the collision margin time TTC even from the early timing.

Figure 5:
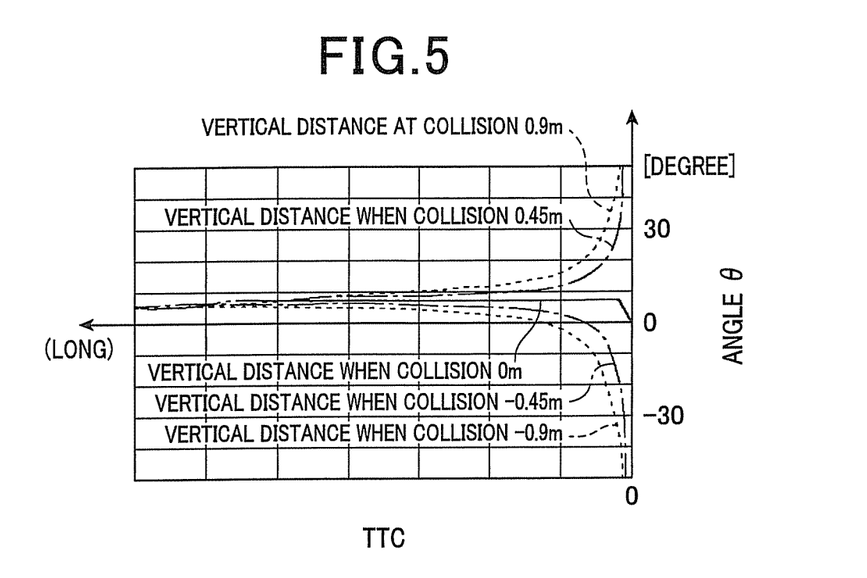
FIG. 5 is a graph showing a change state of the above-described angle at a moving object.

Regarding the angle θ of the moving object with respect to the running direction of the own vehicle, the angle θ changes as shown in FIG. 5. In FIG. 5, the change state of the angle θ of the moving object is shown when a lateral distance which is a distance between the own vehicle and the moving object in a direction perpendicularly to the running direction of the own vehicle is defined. It is noted that FIG. 5 shows the change state of the angle θ when the lateral distances are 0 meter (solid line), 0.45 meter (dashed line) and 0.9 meter (dotted line). In this respect, the angle θ starts from about 5 degree when the collision margin time TTC is longer.

As described above, conventionally, it is considered that the angle θ remains substantially constant when the object moves towards a direction where the own vehicle and the object are likely to collide (i.e., direction that crosses a direction where the own vehicle is running forward). However, as shown in FIG. 5, the inventor found that the angle θ changes when the collision margin time TTC becomes shorter, depending on the lateral distance. That is, considering a collision between the own vehicle and an object, when the object does not collide with the front of the own vehicle, but collides with a location being slightly shifted from the front of own vehicle, the angle θ tends to behave similarly to that of the above-described FIGS. 3 and 4.

Specifically, as shown in solid line in FIG. 5, when the lateral distance of the collision is 0 meter, even when the collision margin time TTC becomes shorter, the angle θ remains constant which is substantially 5 degree, and the angle θ changes to 0 degree from substantially 5 degree during a time immediately before the collision to a time when the collision occurs (TTC=0).

Meanwhile, when the lateral distance of the collision is not 0, the shorter the collision margin time TTC, the larger the angle θ. It is noted that the angle θ is positive value when the angle θ is in the left side with respect to the running direction of the own vehicle and the angle θ is negative value when the angle θ is in the right side with respect to the running direction of the own vehicle. However, the angle θ has larger value in both positive value and negative value.

Also, when the lateral distance of the collision is not 0, the shorter the collision margin time TTC, the angle θ increases rapidly. Moreover, when the lateral distance of the collision is not 0, the longer the collision margin time TTC, the larger the angle θ with respect to the collision margin time TTC even from early timing.

Figure 6:
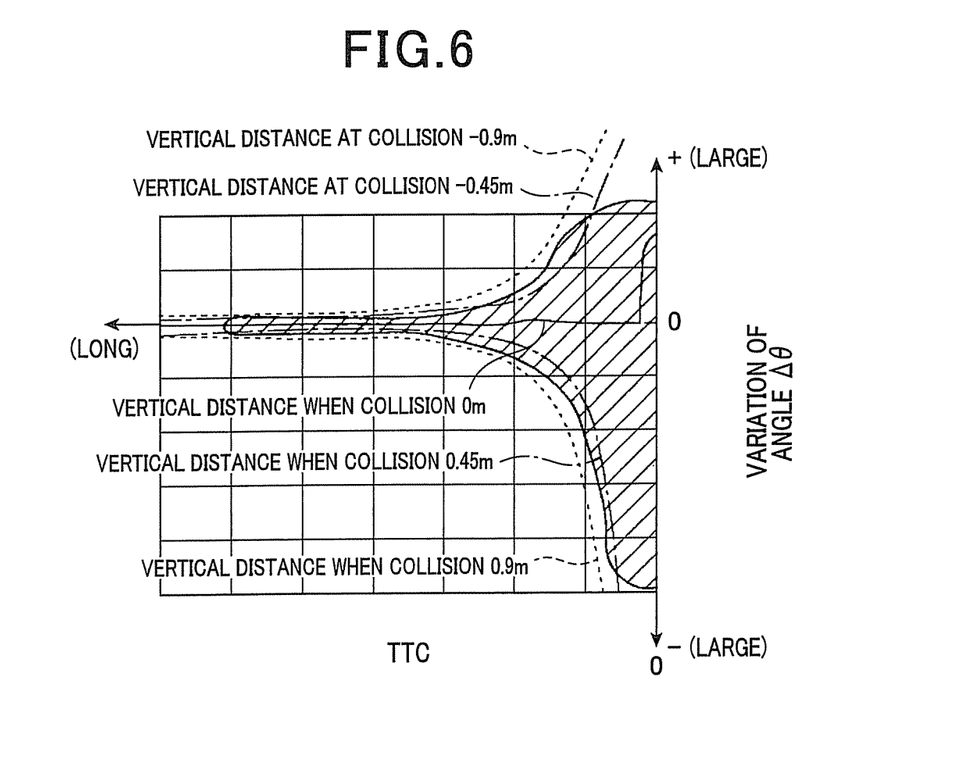
FIG. 6 is a graph showing an amount of change of the above-described angle at a moving object and a collision judging range.

FIG. 6 illustrates a change state of the variation Δθ of the angle θ when the angle θ varies. It is noted that the amount of the variation Δθ is a negative value when the lateral distance of the collision is positive value (in case the object collides with the left side of the own vehicle) and the amount of change Δθ is a positive value when the lateral distance of the collision is negative value (in case the object collides with the right side of the own vehicle).

When the lateral distance of the collision is 0 meter, even if the collision margin time TTC becomes shorter, the variation Δθ has been substantially 0 until immediately before the collision, and the variation Δθ slightly changes towards positive side from value 0 during a period from immediately before the collision to the collision happens (TTC=0).

When the lateral distance of the collision is not 0, in any lateral distances, the shorter the collision margin time TTC, the larger the variation Δθ (the absolute value of the variation Δθ). Moreover, in any lateral distances, when the collision margin time TTC becomes shorter, the variation of Δθ increases rapidly, and the longer the lateral distance, the larger the angle θ with respect to the collision margin time TTC even from early timing.

In this regard, according to the embodiment, the collision avoidance apparatus recognizes the area designated by a hatching (hatching area) as shown in FIG. 6 to be an area in which the own vehicle is likely to collide with the object. Specifically, the maximum value of the variation Δθ in the hatching area is used for the judgment value R. Hence, the judgment value R is set such that the shorter the collision margin time TTC, the larger the judgment value R. The judgment value R remains constant at around 0 when the collision margin time TTC is longer than a predetermined period.

When the own vehicle is approaching to the object, the longer the lateral distance, the larger the angle θ and the larger the variation Δθ. It is noted that when the lateral distance is larger than a length corresponding to the width of the own vehicle, the variation Δθ becomes larger, however, it is not likely to occur a collision between the own vehicle and the object.

In this regard, the judgment value R is set such that the longer the lateral distance, the larger the above-described judgment value R within a value smaller than a predetermined upper value. In other words, the judgment value R is limited to a value within the upper limit value. In FIG. 6, an area having probability of collision is designated by the hatching when the lateral distance is 0.45 meter (−0.45 meter). When the lateral distance is 0.9 meter (−0.9 meter), the hatching area is expanded in upper and lower directions.

Figure 7:
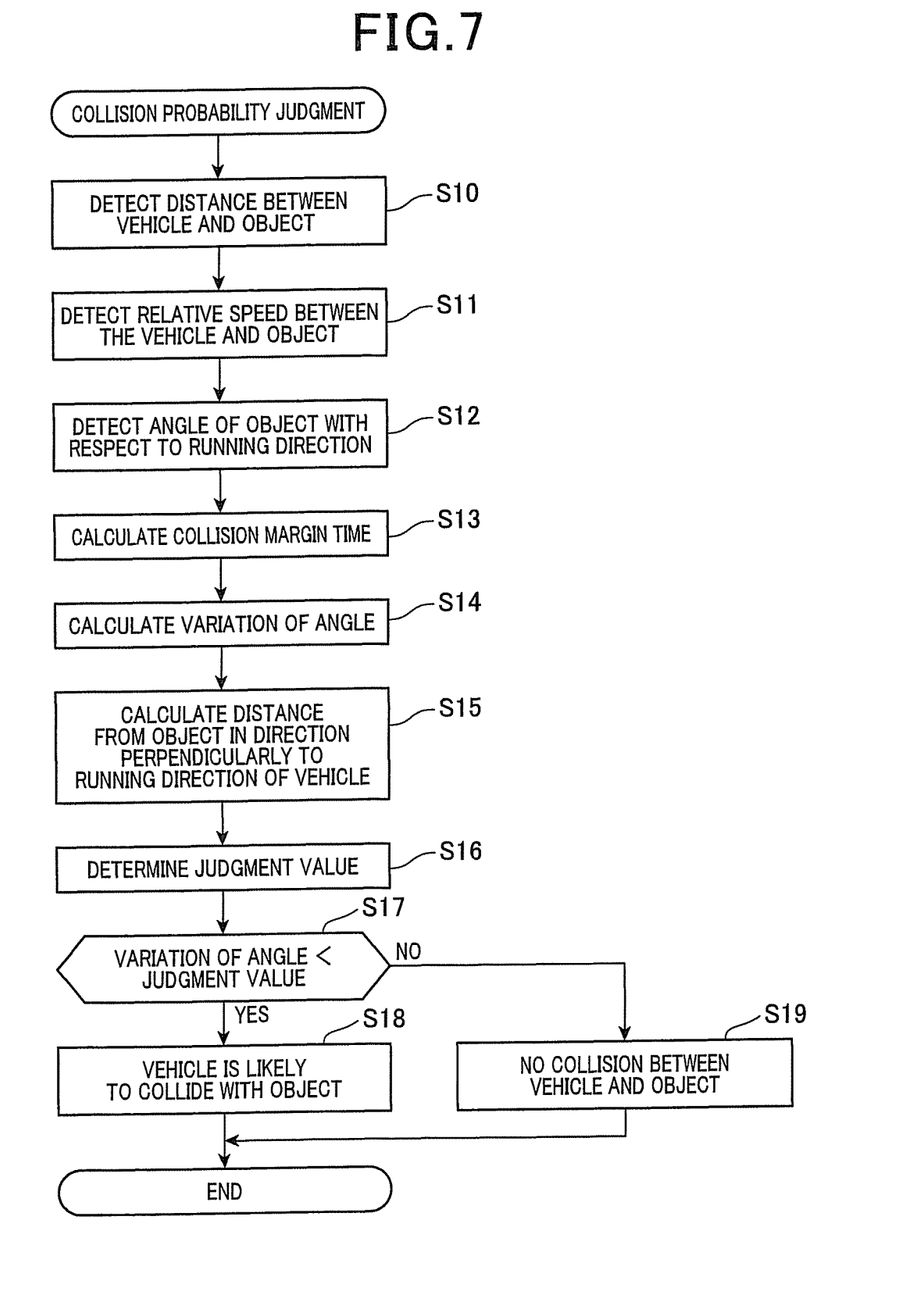
FIG. 7 is a flowchart showing a process of collision-probability judgment.

Next, with reference to FIG. 7, a series of processes used for the collision-probability judgment is described as follows. The series of processes are repeatedly executed by the collision judgment apparatus with a predetermined period.

First, the millimeter wave radar 11 detects a distance between the own vehicle and the object (S10) and detects a relative speed between the own vehicle and the object (S11). The calculation unit 14 calculates the angle θ of the object with respect to the running direction of the own vehicle based on the image acquired by the camera 12 (S12). It is noted that the sequence for executing the processes of S10 to S12 is not determined so that any order can be applied for executing steps S10 to S12.

Subsequently, the calculation unit 14 calculates, based on the detected distance and relative speed between the own vehicle and the object, the collision margin time TTC (S13). The calculation unit 14 calculates, based on the above-described angle θ, the variation Δθ, i.e., variation of the angle θ with respect to the time (S14). The calculation unit 14 (lateral distance calculation block) calculates, based on the detected distance and relative speed between the own vehicle and the object and the calculated angle θ, the lateral distance which is a distance between the own vehicle and a moving object in a direction perpendicularly to the running direction of the own vehicle (S15). It is noted that the sequence for executing the processes of S13 to S15 is not determined so that any order can be applied for executing steps S13 to S15.

Subsequently, the judgment value setting unit 16 applies the collision margin time calculated by the calculation unit 14 and the above-described lateral distance to the graph as shown in FIG. 6 and determines the judgment value R (S16). Specifically, within the hatching area as shown in FIG. 6, the judgment value setting unit 16 determines a maximum value corresponding to the current collision margin time TTC to be the judgment value R. In this respect, the hatching area is changed depending on the lateral distance. In other words, the longer the lateral distance, the more expanded the hatching area is in upper and lower directions so as to set the judgment value R to be larger. It is noted that the judgment value R is limited to a value which is lower than or equal to the upper limit value.

The judgment unit 17 judges whether or not the variation Δθ calculated by the calculation unit 14 is lower than the judgment value R set by the judgment value setting unit 16 (S17). When the judgment unit 17 judges the variation Δθ is lower than the judgment value R (S17: YES), the judgment unit 17 determines that the own vehicle is likely to collide with the object (S18). Meanwhile, the judgment unit 17 judges that the variation Δθ is not lower than the judgment value R (S17: NO), the judgment unit 17 determines that the own vehicle is not likely to collide with the object (S19) and terminates the series of processes (END).

The above-described embodiment includes the following advantages.

When the collision margin time TTC becomes shorter, the angle θ of an object with respect to the running direction of the own vehicle is likely to change. In this respect, the judgment value R is set such that the shorter the collision margin time TTC, the larger the judgment value R. Then, it is determined that the own vehicle is likely to collide with the object when the variation Δθ of the above-described angle θ is lower than the judgment value R. Therefore, even when the collision margin time TTC is small, probability of collision between the own vehicle and the object can be accurately determined.

The lateral distance is calculated based on the distance between the own vehicle and the object and the angle θ therebetween. Then, the judgment value R is set such that the larger the lateral distance, the larger the judgment value R and is set to be lower than the upper limit value. Therefore, since the judgment unit determines that the own vehicle is likely to collide with the object when the variation Δθ is lower than the judgment value R, the probability of the collision can be accurately determined when the collision is likely to happen.

(Modifications)

The above-described embodiment can be modified as follows.

According to the above-described embodiment, the judgment value R is set such that the larger the lateral distance, the larger the judgment value R. However, it is not necessary to change the judgment value R depending on the lateral distance.

When the running speed of the own vehicle is constant, a parallel distance defined by a distance between the own vehicle and the surrounding object in a direction being parallel to the running direction Of the vehicle, and the collision margin time TTC change similarly. Hence, when the parallel distance becomes shorter, it can be judged that the angle θ of the object with respect to the running direction of the own vehicle changes easily.

Figure 8:
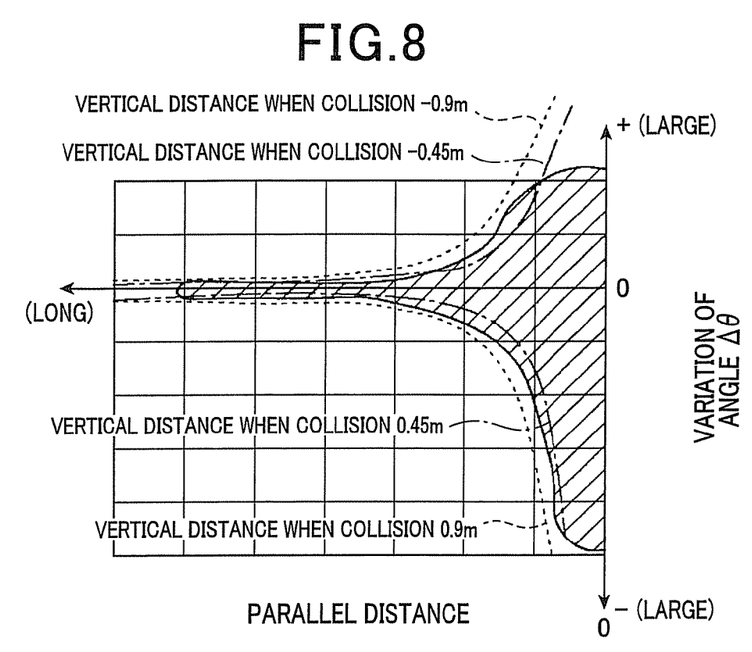
FIG. 8 is a graph showing a change state of the above-described angle with respect to a parallel distance of the moving object and showing a collision judging region.

In this respect, the calculation unit 14 (parallel distance calculation block) calculates the parallel distance based on the distance between the own vehicle and the surrounding object, and the angle θ of the object with respect to the running direction of the own vehicle. As shown in FIG. 8, the judgment value R is set such that the shorter the parallel distance, larger the judgment value R. According to this configuration, since the judgment unit determines that the own vehicle is likely to collide with the object when the variation Δθ is lower than the judgment value R, the probability of the collision can be accurately determined.

When the object is moving towards a direction perpendicular to the running direction of the own vehicle, assuming a vertical velocity which is a velocity in a direction perpendicularly to the running direction of the own vehicle, the higher the vertical velocity, the larger the angle θ of the object with respect to the running direction of the own vehicle and the variation Δθ which is a variation of the angle θ with respect to the time.

Figure 9:
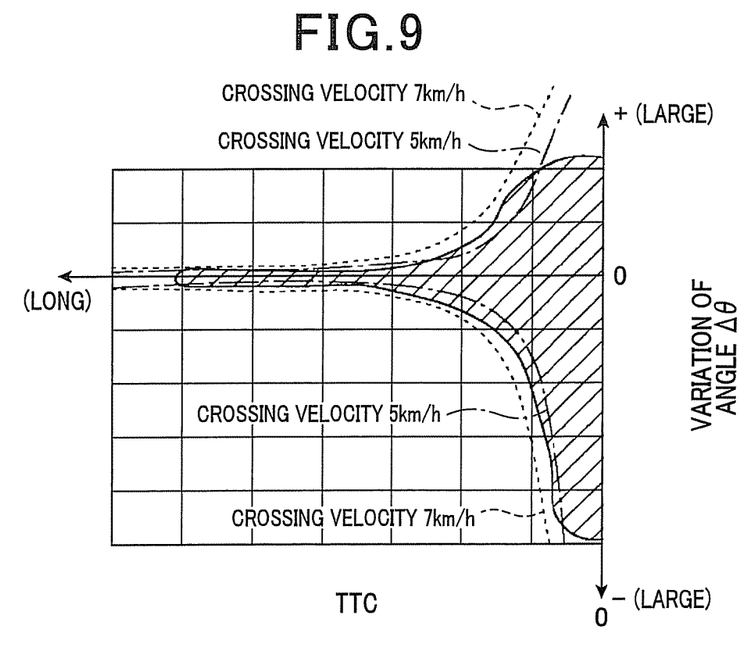
FIG. 9 is a graph showing a change state of the above-described angle with respect to a cross speed of the moving object and showing a collision judging region.

In this respect, the calculation unit 14 (vertical velocity calculation block) calculates the vertical velocity based on the distance between the own vehicle and the surrounding object and the angle θ of the object with respect to the running direction of the own vehicle. Specifically, the calculation unit 14 calculates the distance between the own vehicle and the surrounding object in a direction perpendicularly to the running direction of the vehicle at a plurality of points of times, and calculates the vertical velocity based on difference of the distances and difference of the time at the plurality, of points of times. As shown in FIG. 9, the judgment value R is set such that the higher the vertical velocity (crossing-velocity), the larger the judgment value R. According to this configuration, it is determined that the own vehicle is likely to collide with the surrounding object when the variation Δθ is smaller than the judgment value R, whereby the probability of collision can be determined accurately.

Even if the collision margin time TTC is the same value, the higher the relative speed between the own vehicle and the surrounding object, the larger the variation Δθ which is an amount of variation of the angle θ with respect to the time in the running direction of the own vehicle.

Figure 10:
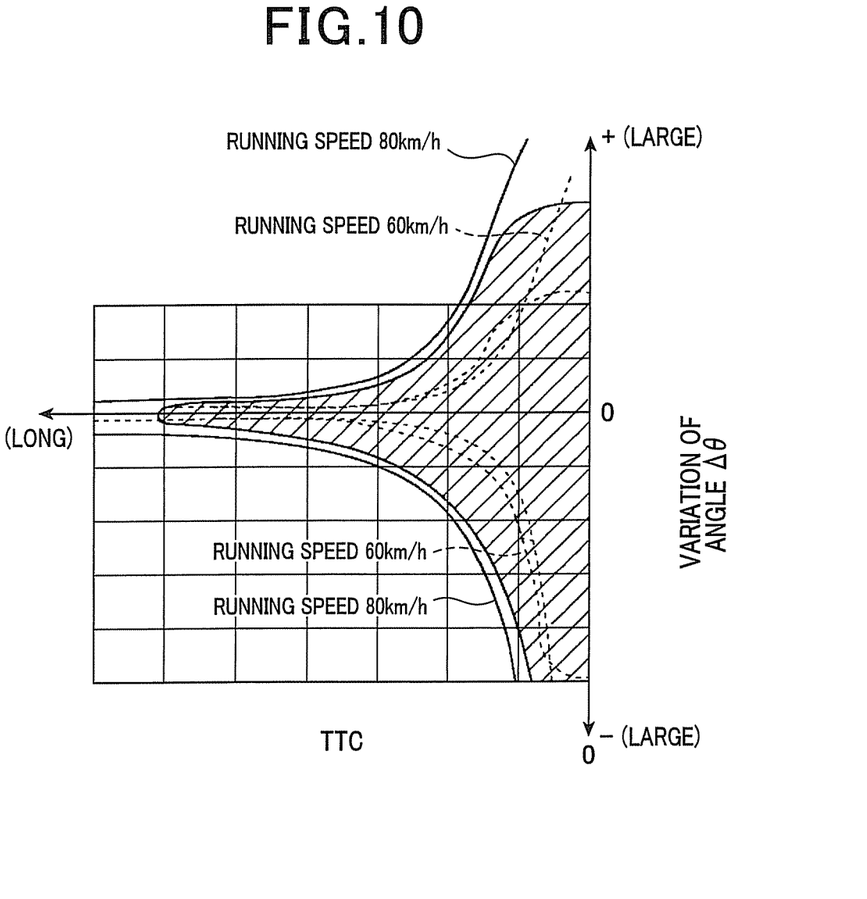
FIG. 10 is a graph showing a change state of the above-described angle which responds to the running speed of the vehicle and showing a collision judging region.

In this respect, as shown in FIG. 10, the judgment value R is set such that the higher the relative speed (running speed of the own vehicle), the larger the judgment value R. In FIG. 10, the variation Δθ when the running speed of the vehicle is 60 km/h and a range (hatching area) representing a probability of collision are illustrated by a dotted line, and the variation Δθ when the running speed of the vehicle is 80 km/h and a range representing a probability of collision are illustrated by a solid line. According to this configuration, it is determined that the own vehicle is likely to collide with the surrounding object when the variation Δθ is smaller than the judgment value R, whereby the probability of collision can be determined accurately.

As an angle detecting unit that detects the angle of the surrounding object with respect to the running direction of the own vehicle, a millimeter wave radar apparatus including an adaptive array antenna can be employed.

As a distance detecting unit that detects the distance between the own vehicle and the surrounding object, a stereo camera and an image processing unit that processes the image acquired by the stereo camera can be employed.

What is claimed is:

1. A collision judgment apparatus comprising:
a distance detecting unit that detects distance between a vehicle and an object;
a relative speed detecting unit that detects a relative speed between the vehicle and the object;
a margin time calculation unit that calculates a margin time which is a time to collision between the vehicle and the object, based on the distance detected by the distance detecting unit and the relative speed detected by the relative speed detecting unit;
an angle detecting unit that detects an angle of the object with respect to a running direction of the vehicle;
a variation calculation unit that calculates a variation of the angle over time, the angle being detected by the angle detecting unit;
a judgment value setting unit that sets a judgment value such that the shorter the margin time, the larger the judgment value; and
a judgment unit that judges that the vehicle is likely to collide with the object when the variation of the angle calculated by the variation calculation unit is lower than the judgment value set by the judgment value setting unit.

2. The collision judgment apparatus according to claim 1, wherein
the collision judgment apparatus includes a lateral distance calculation block that calculates a lateral distance defined as a distance between the vehicle and the object in a direction perpendicular to the running direction of the vehicle, based on the distance detected by the distance detecting unit and the angle detected by the angle detecting unit; and
the judgment value setting unit sets the judgment value such that the longer the lateral distance, the larger the judgment value within a range smaller than a predetermined upper value.

3. The collision judgment apparatus according to claim 1, wherein
the collision judgment apparatus includes parallel distance calculation block that calculates a parallel distance defined as a distance between the vehicle and the object in a direction being parallel to the running direction of the vehicle, based on the distance detected by the distance detecting unit and the angle detected by the angle detecting unit; and
the judgment value setting unit sets the judgment value such that the longer the parallel distance, the larger the judgment value.

4. The collision judgment apparatus according to claim 1, wherein
the collision judgment apparatus includes a vertical velocity calculation block that calculates a vertical velocity which is a velocity in a direction perpendicular to the running direction of the vehicle, based on the distance detected by the distance detecting unit and the angle detected by the angle detecting unit; and
the judgment value setting unit sets the judgment value such that the higher the vertical velocity, the larger the judgment value.

5. The collision judgment apparatus according to claim 1, wherein
the judgment value setting unit sets the judgment value such that the higher the relative speed detected by the relative speed detecting unit, the larger the judgment value.

6. A collision avoidance apparatus comprising:
a distance detecting unit that detects distance between a vehicle and an object surrounding the vehicle;
a relative speed detecting unit that detects a relative speed between the vehicle and the object;
a margin time calculation unit that calculates a margin time which is a time to collision between the vehicle and the object, based on the distance detected by the distance detecting unit and the relative speed detected by the relative speed detecting unit;
an angle detecting unit that detects an angle of the object with respect to a running direction of the vehicle;
a variation calculation unit that calculates a variation of the angle over time, the angle being detected by the angle detecting unit;
a judgment value setting unit that sets a judgment value such that the shorter the margin time, the larger the judgment value;
a judgment unit that judges that the vehicle is likely to collide with the object when the variation of the angle calculated by the variation calculation unit is lower than the judgment value set by the judgment value setting unit; and
an avoidance operation unit that operates an avoidance operation so as to avoid a collision between the vehicle and the object, when the judgment unit judges that the vehicle is likely to collide with the object.

7. The collision avoidance apparatus according to claim 6, wherein
the collision avoidance apparatus includes a lateral distance calculation block that calculates a lateral distance defined as a distance between the vehicle and the object in a direction perpendicular to the running direction of the vehicle, based on the distance detected by the distance detecting unit and the angle detected by the angle detecting unit; and
the judgment value setting unit sets the judgment value such that the longer the lateral distance, the larger the judgment value within a value smaller than a predetermined upper value.

8. The collision avoidance apparatus according to claim 6, wherein
the collision avoidance apparatus includes a parallel distance calculation block that calculates a parallel distance defined as a distance between the vehicle and the object in a direction being parallel to the running direction of the vehicle, based on the distance detected by the distance detecting unit and the angle detected by the angle detecting unit; and
the judgment value setting unit sets the judgment value such that the longer the parallel distance, the larger the judgment value.

9. The collision avoidance apparatus according to claim 6, wherein
the collision avoidance apparatus includes a vertical velocity calculation block that calculates a vertical velocity which is a velocity in a direction perpendicularly to the running direction of the vehicle, based on the distance detected by the distance detecting unit and the angle detected by the angle detecting unit; and
the judgment value setting unit sets the judgment value such that the higher the vertical velocity, the larger the judgment value.

10. The collision avoidance apparatus according to claim 6, wherein the judgment value setting unit sets the judgment value such that the higher the relative speed detected by the relative speed detecting unit, the larger the judgment value.

* * * * *